(12) United States Patent
Sudo et al.

(10) Patent No.: US 7,909,081 B2
(45) Date of Patent: Mar. 22, 2011

(54) SHEET LAMINATOR, IMAGE FORMING APPARATUS, AND SHEET LAMINATING METHOD

(75) Inventors: Kazuhisa Sudo, Kanagawa (JP); Mikio Ishibashi, Kanagawa (JP); Reki Nakamura, Kanagawa (JP); Megumi Ohtoshi, Kanagawa (JP); Yukiko Iwasaki, Kanagawa (JP); Kazuhiko Yuki, Kanagawa (JP); Nobuyuki Koinuma, Kanagawa (JP); Takashi Sakamaki, Kanagawa (JP); Ryuji Yoshida, Kanagawa (JP); Takehide Mizutani, Kanagawa (JP); Kohsuke Yamamoto, Shizuoka (JP)

(73) Assignee: Ricoh Company, Limited, Tokyo (JP)

( * ) Notice: Subject to any disclaimer, the term of this patent is extended or adjusted under 35 U.S.C. 154(b) by 202 days.

(21) Appl. No.: 12/076,202

(22) Filed: Mar. 14, 2008

(65) Prior Publication Data

US 2008/0223515 A1 Sep. 18, 2008

(30) Foreign Application Priority Data

Mar. 15, 2007 (JP) ................................. 2007-067294
Jul. 27, 2007 (JP) ................................. 2007-196053

(51) Int. Cl.
B29C 65/00 (2006.01)

(52) U.S. Cl. ....................................... 156/555; 156/324

(58) Field of Classification Search .................... 156/87, 156/387, 295, 384, 324, 555
See application file for complete search history.

(56) References Cited

U.S. PATENT DOCUMENTS

| RE36,601 E | * | 3/2000 | Woods et al. .................. 156/271 |
| 2002/0001497 A1 | * | 1/2002 | Naniwa et al. ............. 400/118.2 |
| 2002/0118987 A1 | * | 8/2002 | Takekoshi ...................... 399/342 |
| 2003/0000637 A1 | * | 1/2003 | Campion et al. .............. 156/264 |
| 2005/0211369 A1 | * | 9/2005 | Aso et al. ........................ 156/235 |

FOREIGN PATENT DOCUMENTS

| JP | 63-113576 | | 5/1988 |
| JP | 03-050586 | | 3/1991 |
| JP | 11-208062 | | 8/1999 |
| JP | 2001-222171 | | 8/2001 |
| JP | 2002-341623 | | 11/2002 |
| JP | 2003-015524 | | 1/2003 |
| JP | 2003-270991 | | 9/2003 |
| JP | 2004-191678 | | 7/2004 |
| JP | 2005-221934 | | 8/2005 |
| JP | 2005-298208 | * | 10/2005 |
| JP | 2006-308876 | | 11/2006 |

* cited by examiner

*Primary Examiner* — Khanh Nguyen
*Assistant Examiner* — Vishal I Patel
(74) *Attorney, Agent, or Firm* — Harness, Dickey & Pierce, P.L.C.

(57) ABSTRACT

A sheet laminator includes a bonding unit and a restricting unit. The bonding unit bonds a first sheet to a second sheet that includes an adhesive layer. The restricting unit restricts movement of any one of the first sheet and the second sheet thereby preventing bonding between the first sheet and the second sheet before the first sheet and the second sheet reach the bonding unit.

19 Claims, 12 Drawing Sheets

FRONT FACE OF WHITE MEDIUM (ADHESIVE LAYER)

BACK FACE OF WHITE MEDIUM

SHEET LAMINATOR, IMAGE FORMING APPARATUS, AND SHEET LAMINATING METHOD

CROSS-REFERENCE TO RELATED APPLICATIONS

The present application claims priority to and incorporates by reference the entire contents of Japanese priority documents 2007-067294 filed in Japan on Mar. 15, 2007 and 2007-196053 filed in Japan on Jul. 27, 2007.

BACKGROUND OF THE INVENTION

1. Field of the Invention

The present invention relates to a sheet laminator, an image forming apparatus, and a sheet laminating method.

2. Description of the Related Art

Conventionally, various attempts have been made to obtain a glossy photographic-quality image on a recording medium using an image forming apparatus that forms a latent image on a photoconductive member in an image forming unit with laser beams emitted from an optical writing unit, develops the latent image with toner, transfers the obtained toner image to the recording medium conveyed by a paper feeder, and fixes the toner image on the recording medium.

For instance, Japanese Patent Application Laid-open No. 2002-341623 describes a technique that uses special toner to attain a glossy image. According to the technique, a photographic quality can be achieved by uniformly applying transparent toner on an entire surface of a sheet, on which an image has been formed according to a conventional method but not processed by a fixing unit yet, and fixing the toner onto the sheet.

Japanese Patent Application Laid-open No. 2004-191678 describes a technique that uses a special recording medium to obtain a glossy image. According to the technique, a surface of a sheet become uniformly glossy by providing a thermoplastic resin layer on a front face or a back face of the sheet, fixing an image onto the sheet by a conventional method, and applying additional pressure and heat to the sheet.

Japanese Patent Application Laid-open No. 2003-270991 describes a technique that uses a special fixing device to obtain a glossy image. According to the technique, a second fixing unit formed from a highly-smooth belt is provided so that toner having been fixed by conventional fixing (first fixing) is melted for a second time, thereafter cooled, and stripped off. By utilizing smoothness of the belt, a uniform gloss can be obtained.

Japanese Patent Application Laid-open No. H3-50586 discloses a simple technique of simply adopting a transparent film into an image forming apparatus. According to the technique, after a mirror image is formed on a transparent film, a white paper or a white board is affixed to the transparent film in close contact. When viewed from a side of the transparent film, the image attains a high gloss and a high photographic quality.

However, in the technique described in Japanese Patent Application Laid-open No. 2002-341623 the transparent toner is required to be applied to an entire surface at each time, and the transparent toner may blur images. It is also necessary to develop an image forming apparatus dedicated for the technique, and therefore it requires a large-scale development and investment.

The technique described in Japanese Patent Application Laid-open No. 2004-191678 can yield its effect only in combined use with the special fixing device described in Japanese Patent Application Laid-open No. 2003-270991. Accordingly, there are needs for an advanced technique in terms of structure, cost, power consumption, and the like.

In the technique disclosed in Japanese Patent Application Laid-open No. H3-50586; the transparent film is manually brought into close contact with the white sheet or the white board using an adhesive agent or the like. Therefore, image quality may be deteriorated due to imprecise bonding (displacement) or diffuse reflection caused by bubbles trapped therebetween.

Meanwhile, bonding the sheets together as described above involves a problem of entrapment of bubbles between sheets. Particularly, when such an image recording sheet as describe above is used, as a matter of course, irregular reflection is caused by trapped bubbles even if the bubbles are extremely small in size and amount. In some cases, the bubbles can cause the sheet to appear dusty, spoiling an image formed thereon.

SUMMARY OF THE INVENTION

It is an object of the present invention to at least partially solve the problems in the conventional technology.

According to an aspect of the present invention, there is provided a sheet laminator. The sheet laminator includes a bonding unit that bonds a first sheet to a second sheet that includes an adhesive layer; and a restricting unit that restricts movement of any one of the first sheet and the second sheet thereby preventing bonding between the first sheet and the second sheet before the first sheet and the second sheet reach the bonding unit.

According to another aspect of the present invention, there is provided an image forming apparatus. The image forming apparatus includes an image forming unit that forms an image on a first sheet; and the sheet laminator described above.

According to still another aspect of the present invention, there is provided a sheet laminating method. The sheet laminating method includes bonding a first sheet to a second sheet that includes an adhesive layer at a predetermined position; and restricting movement of any one of the first sheet or the second sheet thereby preventing bonding between the first sheet and the second sheet before the first sheet and the second sheet reach the predetermined position.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be described below in detail with reference to the accompanying drawings.

Figure 1:
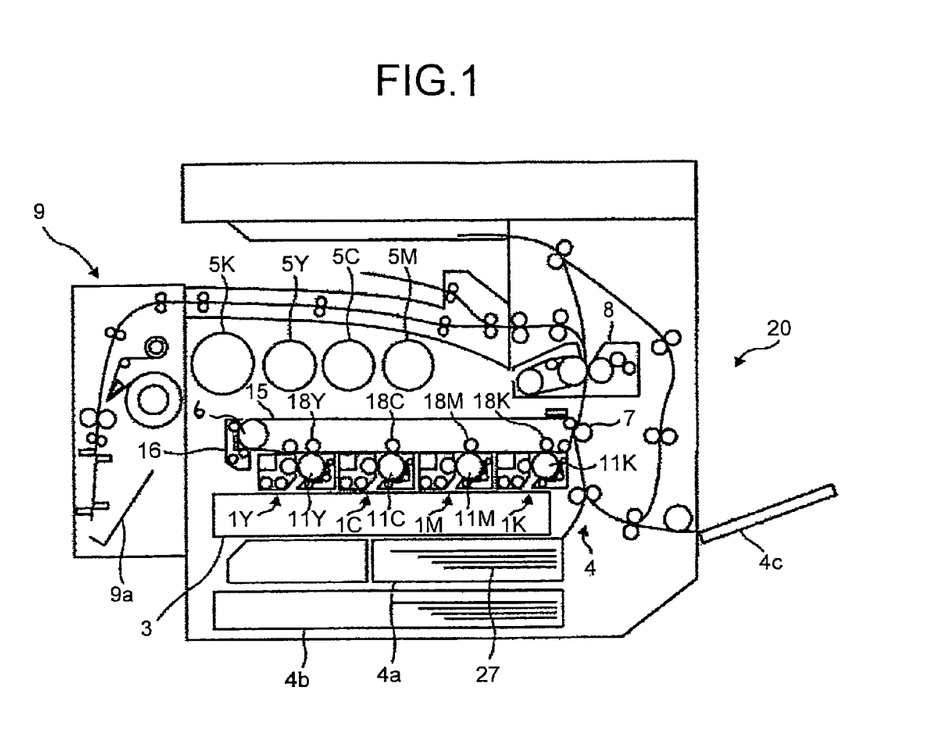
FIG. 1 is a schematic diagram of the configuration of an image forming apparatus according to an embodiment of the present invention.
Figure 2:
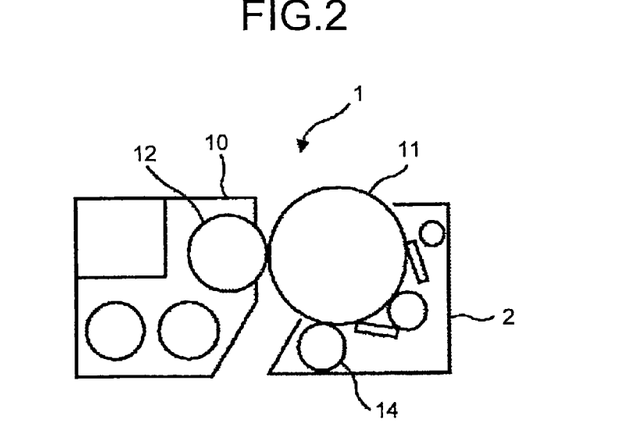
FIG. 2 is a schematic diagram of the configuration of a photoconductor unit and a developing unit in an image forming unit shown in FIG. 1.

A first embodiment of the present invention will be described with reference to the drawings. FIG. 1 is a schematic diagram of an image forming apparatus according to the first embodiment. FIG. 2 is a schematic diagram of the configuration of an image forming unit 1 shown in FIG. 1 that includes a photoconductor unit 2 and a developing unit 10.

The image forming apparatus includes a main body 20 and a laminator 9. The laminator 9 is provided beside the main body 20 to perform a predetermined post processing on a recording medium ejected from the main body 20.

With reference to FIGS. 1 and 2, the main body 20 includes four image forming units 1Y, 1C, 1M, and 1K that form color images of yellow (Y), cyan (C), magenta (M), and black (K), respectively. Note that the order of the colors: Y, C, M, and K is not limited to that shown in FIG. 1, and the colors can be in another order. With reference to FIG. 2, the image forming unit 1 representatively depicts relevant parts of the image forming units 1Y, 1C, 1M, and 1K without being limited to a specific one of the colors.

Each of the image forming units 1Y, 1C, 1M, and 1K includes a charging unit, a developing unit, a cleaning device, and a corresponding one of photosensitive drums 11Y, 11C, 11M, and 11K that functions as an image carrier. The image forming units 1Y, 1C, 1M, and 1K are situated such that rotation axes of the photosensitive drums 11Y, 11C, 11M, and 11K are parallel to each other and arranged at a predetermined pitch in a traveling direction of recording medium.

As shown FIG. 2, in which the image forming unit 1 is depicted without symbols each indicating a color, the image forming unit 1 includes the photoconductor unit 2 and the developing unit 10. Reference numerals are attached only to a charging roller 14, which is the charging unit, and the photosensitive drum 11 in the photoconductor unit 2. Reference numeral is attached in the developing unit 10 only to a developing roller 12.

With reference to FIG. 1, an optical writing unit 3 that includes a light source, a polygon mirror, an fθ lens, a reflection mirror, and the like is provided below the image forming units 1Y, 1C, 1M, and 1K. The optical writing unit 3 scans surfaces of the photosensitive drums 11Y, 11C, 11M, and 11K with laser beams based on image data.

A primary transfer unit 6 is provided above the image forming units 1Y, 1C, 1M, and 1K. The primary transfer unit 6 functions as a belt drive that includes a transfer conveyance belt 15 for conveying toner images formed by the image forming units 1Y, 1C, 1M, and 1K so that the toner images are transferred and superimposed on one another. A cleaning device 16 that includes a brush roller and a cleaning blade is provided such that the cleaning device 16 comes into contact with an outer circumferential surface of the transfer conveyance belt 15. The cleaning device 16 removes foreign materials such as toner sticking onto the transfer conveyance belt 15.

A secondary transfer unit 7 that transfers the toner images onto recording medium 27 is provided on the right of the primary transfer unit 6. A belt-type fixing unit 8 is provided above the primary transfer unit 6. Paper feed cassettes 4a and 4b for accommodating the recording medium 27 therein are provided below the main body 20. A bypass tray 4c, through which paper is manually fed, is provided in a side face of the main body 20.

With reference to FIG. 1, the main body 20 includes, in addition to toner supply containers 5Y, SC, 5M, and 5K and primary transfer rollers 18Y, 18C, 18M, and 18K, a waste toner bottle (not shown), a power supply unit (not shown), or the like.

With reference to FIG. 2, the developing unit 10 for any one of the colors Y, C, M, and K, as a developer of the image forming unit 1, has a similar configuration as that described above. Each of the developing units 10 for Y, C, M, and K, which differ from one another in only a toner color, is a two-component developing system and houses a developing agent containing toner and magnetic carrier.

Meanwhile, when the developing unit 10 uses a polymer toner with a small particle size as the toner for image forming, a photographic image quality is further improved, and hence image forming of a high photographic image quality is attained.

The developing unit 10 includes the developing roller 12 that faces the photosensitive drum 11, a screw for conveying and stirring the developing agent, and a toner concentration sensor. The developing roller 12 includes an externally-provided rotatable sleeve and a magnet (not shown) fixed to an inside of the developing roller 12. A toner supplier supplies toner according to an output of the toner concentration sensor.

First, the power supply unit applies a predetermined voltage to the charging roller 14, and then the charging roller 14 charges a surface of the photosensitive drum 11 that faces the charging roller 14. Subsequently, the optical writing unit 3 scans the surface of the photosensitive drum 11, which is charged with a certain potential, with laser beams, thereby writing a latent image thereon.

When the surface of the photosensitive drum 11 carrying the latent image thereon reaches the developing unit 10, the developing roller 12 facing the photosensitive drum 11 develops the latent image on the surface of the photosensitive drum 11 with toners, thereby forming a toner image.

This operation is similarly performed for each of the photoconductor units 2 (2Y, 2C, 2M, and 2K) of the image forming units 1Y, 1C, 1M, and 1K at a predetermined timing. Consequently, a toner image of a corresponding color is formed on the surface of each of the photosensitive drums 11Y, 11C, 11M, and 11K.

The recording medium 27 is conveyed from any one of the paper feed cassettes 4a and 4b and the bypass tray 4c. Upon reaching a pair of registration rollers 4, the recording medium 27 is temporarily stopped. The toner images on the photosensitive drums 11Y, 11C, 11M, and 11K are successively transferred onto the transfer conveyance belt 15 in synchronization with an image forming operation performed by the photoconductor units 2 (2Y, 2C, 2M, and 2K).

More specifically, each of the primary transfer rollers 18Y, 18, 18M, and 18K situated to face the photosensitive drums 11Y, 11, 11M, and 11K, respectively, with the transfer conveyance belt 15 therebetween applies a voltage delivered by the power supply and of the opposite polarity to that of the charge of the toner, thereby transferring the toner images to the recording medium 27.

The four color toner images pass through a portion facing the photosensitive drum 11K, which is a most downstream one in the arrangement shown in FIG. 1, and superimposed on one another into a toner image. The toner image is then transferred onto the recording medium 27 fed out by the registration rollers 4. The recording medium 27 is subsequently conveyed to the fixing unit 8 that applies heat and pressure to the recording medium 27. Hence, the toner image is fixed onto the recording medium 27.

Meanwhile, when the recording medium 27 is such transfer paper that can pass through the main body 20 and includes at least a transparent portion, a mirror image is formed on the recording medium 27. After passing through the fixing unit 8, the recording medium 27 is conveyed to the laminator 9.

The laminator 9 includes a stacker 9a on which the recording medium 27 having been laminated and cut as required are loaded. Although the explanation is made assuming that the recording medium 27 is a special sheet having at least a transparent portion and capable of passing through the main body 20, the recording medium 27 can be a regular paper.

The present invention relates to a technique for the main body 20 constructed as described above. According to the technique, a mirror image is formed on a recording medium having at least a transparent portion and capable of passing through the main body 20. Thereafter, a medium, which has a transparent or white adhesive layer thereon and which is opaque white in its entirety including the adhesive layer, is bonded to a surface of the recording medium on which an imaged is formed, thereby obtaining a laminate recording medium.

Figure 3:
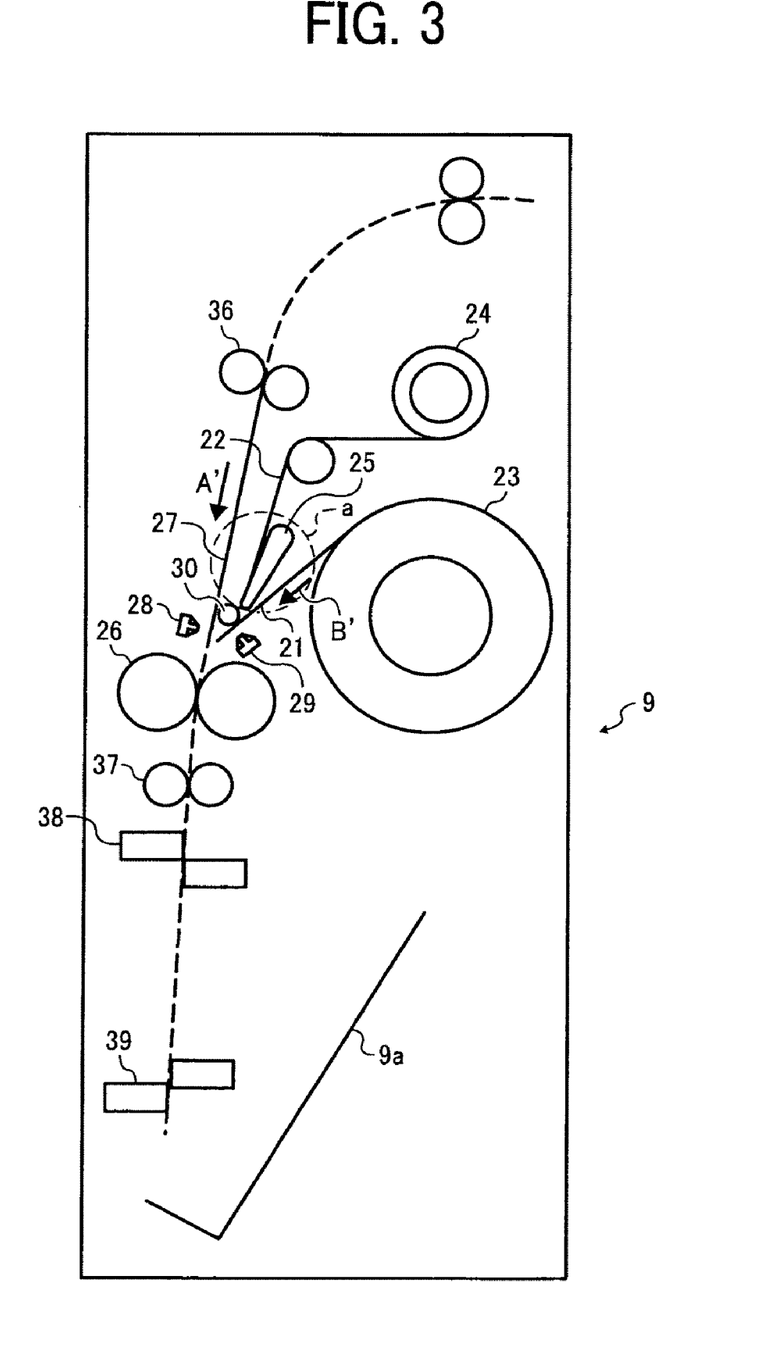
FIG. 3 is a schematic diagram of relevant parts of a laminator according to the embodiment that bonds two media together.

FIG. 3 is a schematic diagram of relevant parts of the laminator 9, according to the first embodiment that bonds two recording media together. In a series of steps of bonding the two recording media together performed by the laminator 9, the sticking preventer prevents the two recording media from sticking to each other in an area upstream of a bonding position of the recording media. This configuration prevents bonding of the two recording media at an unintended timing.

With reference to FIG. 3, an opaque medium 21 including an adhesive layer in a state that the adhesive layer is attached on release paper 22 is wound around an opaque medium roll 23. When the opaque medium 21 is fed to a conveying path side (bonding position) of the transparent recording medium 27, the release paper 22 is stripped off from the opaque medium 21 by a separating plate 25 and then wound up by a release-paper wind-up roller 24.

The separating plate 25 separates the opaque medium 21 from the release paper 22 by self stripping. In the first embodiment, sensors 28 and 29 that detect positions of leading ends of the opaque medium 27 and the opaque medium 21, respectively, are provided at positions immediate upstream of a pair of pressure rollers 26.

Based on signals supplied from the sensors 28 and 29, a controller sends control signals to the laminator 9. The control signals allows the laminator 9 to adjust the positions of the leading ends of the transparent recording medium 27 and the opaque medium 21 to be flush with each other. The stacker 9a is arranged below the laminator 9 as shown in FIG. 3.

A sticking preventer 30 functioning as a rotator is provided between the separating plate 25 and the transparent recording medium 27. The sticking preventer 30 is rotated by a drive source (not shown). ON and OFF of rotation of the sticking preventer 30 can be controlled by appropriate means, such as a clutch, using signals supplied from the sensors 28 and 29 as a trigger.

Figure 4:
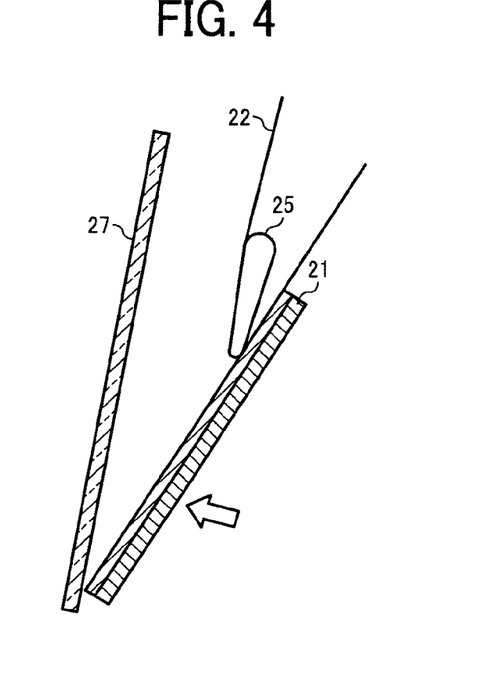
FIG. 4 is an enlarged view of a dashed-line circle shown in FIG. 3, explaining a first state for bonding a transparent recording medium and an opaque medium together.
Figure 5:
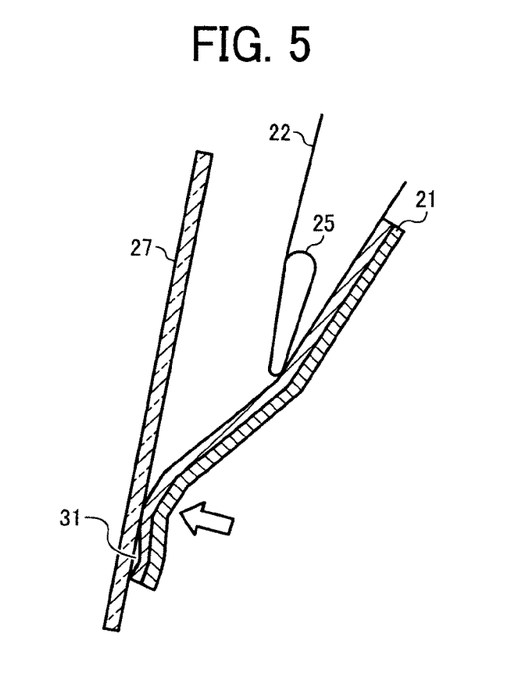
FIG. 5 is an enlarged view of the dashed-line circle shown in FIG. 3, explaining a second state for bonding the transparent recording medium and the opaque medium together.
Figure 6:
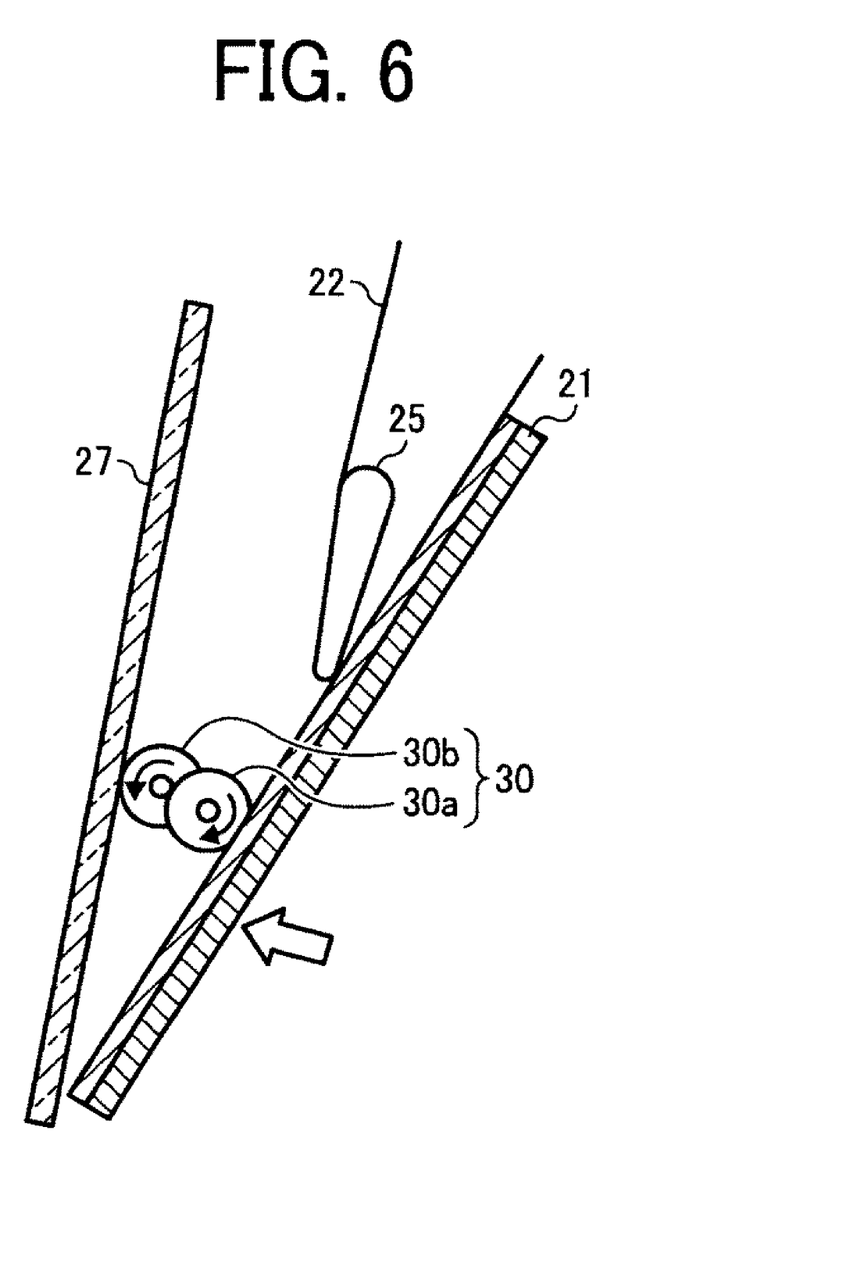
FIG. 6 is an enlarged view of the dashed-line circle and a sticking preventer arranged downstream of the dashed-line circle shown in FIG. 3 explaining the first state for bonding the transparent recording medium and the opaque medium together.

FIG. 4 is an enlarged view of a circle a indicated by a dashed line shown in FIG. 3, explaining a first state for bonding the transparent recording medium 27 and the opaque medium 21 together. FIG. 5 is an enlarged view of the circle a shown in FIG. 3, explaining a second state for bonding the transparent recording medium 27 and the opaque medium 21 together. FIG. 6 is an enlarged view of the circle a and the sticking preventer 30 arranged downstream of the circle a, explaining the first state for bonding the transparent recording medium 27 and the opaque medium 21 together.

Bonding the transparent recording medium 27 and the opaque medium 21 together will be described specifically with reference to FIGS. 4 to 6.

A free end, which is a portion indicated by an arrow shown in FIG. 4, of the opaque medium 21 separated from the separating plate 25 is without restraint as shown in FIG. 4. Accordingly, as shown in FIG. 5, the free end can unintentionally stick to the transparent recording medium 27 while acquiring wrinkles and bearing bubbles 31 in an area, in which the opaque medium 21 sticks to the transparent recording medium 27. To prevent such an inconvenience, the sticking preventer 30 that includes sticking preventing rollers 30a and 30b are provided upstream of a junction at which the opaque medium 21 and the transparent recording medium 27 join together, so that the two media 21 and 27 are prevented from contacting each other at an undesired position.

Figure 7:
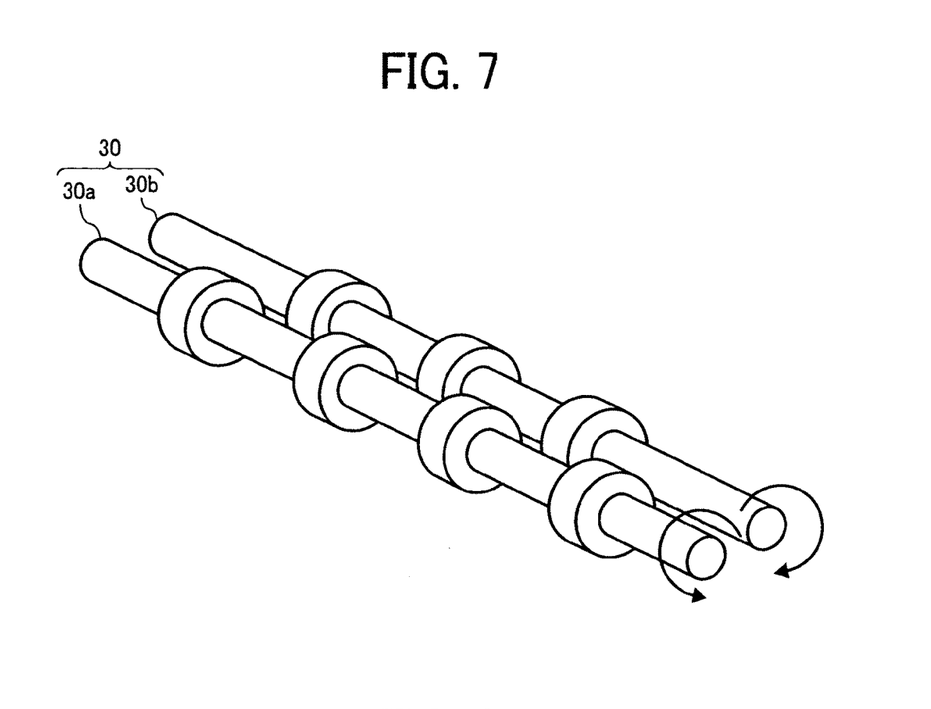
FIG. 7 is a perspective view of a first example of the sticking preventer.
Figure 8:
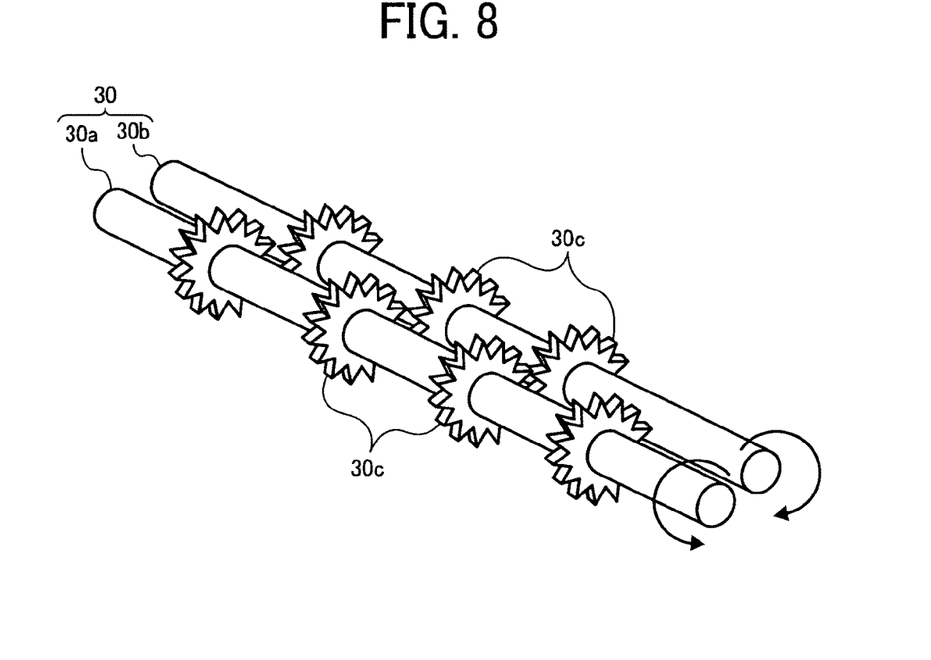
FIG. 8 is a perspective view of a second example of the sticking preventer.

FIG. 7 is a perspective view of a first example of the sticking preventer 30. FIG. 8 is a perspective view of a second example of the sticking preventer 30.

The sticking preventer 30 includes the sticking preventing rollers 30a and 30b; which are counter-rotating rollers, and two shafts supporting axial centers of the sticking preventing rollers 30a and 30b; respectively. The sticking preventing rollers 30a and 30b are provided in a staggered arrangement to decrease a distance between the two shafts (hereinafter, "center distance") as shown in FIG. 7 so that the two shafts are located near the position at which the two recording media 21 and 27 (see, FIG. 6) are bonded together.

For such an arrangement, in which the sticking preventing rollers 30b on a side of the recording medium 27 and the sticking preventing rollers 30a on a side of the opaque medium 21 an axially staggered, it is more preferable that the center distance of the sticking preventing rollers 30a and 30b is smaller than a sum of a radius of the roller 30a and that of the roller 30b.

Meanwhile, spur-shaped portions of the sticking preventing rollers 30a and 30b can alternatively be shaped like spur-shaped portions 30c as shown in FIG. 8.

Because the sticking preventer 30 includes the sticking preventing rollers 30a and 30b as described above, the sticking preventer 30 is prevented from sticking with adhesive agent. Accordingly, smooth and reliable bonding between the media 21 and 27 is attained. When the center distance of the sticking preventing rollers 30a and 30b is decreased, the sticking preventer 30 can be located near the position at which the two media 21 and 27 are bonded together.

When surfaces of the sticking preventing rollers 30a and 30b has a friction coefficient as low as that of a releasing surface of the release paper 22 (see FIG. 6), the adhesive layer on the opaque medium 21 is prevented from sticking to the sticking preventing rollers 30a and 30b, thereby attaining smooth and reliable bonding between the two media 21 and 27.

When at least the sticking preventing rollers 30a on the side of the opaque medium 21 includes spur-shaped members, the sticking preventing rollers 30a are prevented from sticking to the adhesive layer, thereby attaining smooth and reliable bonding between the two media 21 and 27.

Figure 9:
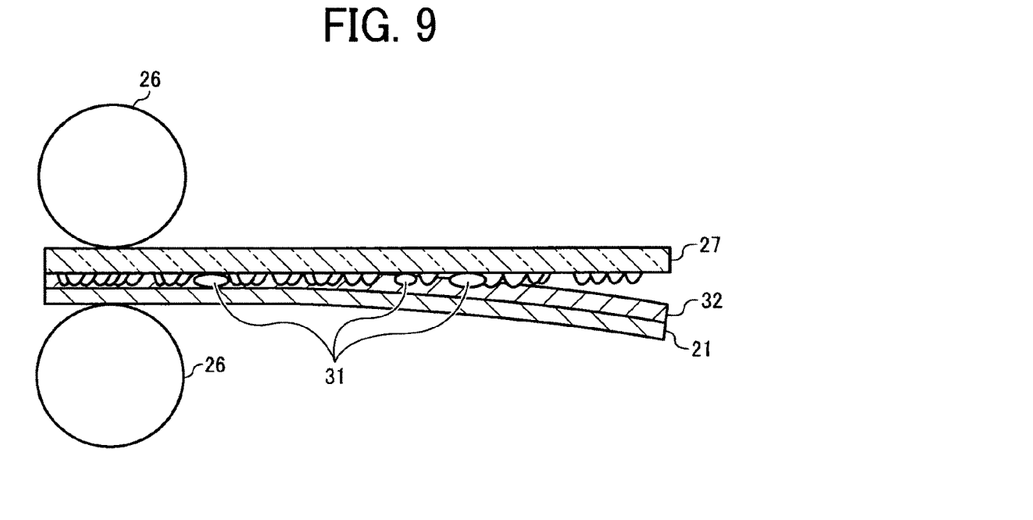
FIG. 9 is a schematic diagram of the transparent recording medium and the opaque medium that are bonded to each other without using any sticking preventer and enter between a pair of pressure rollers, thereby bearing bubbles between the mediums.
Figure 10:
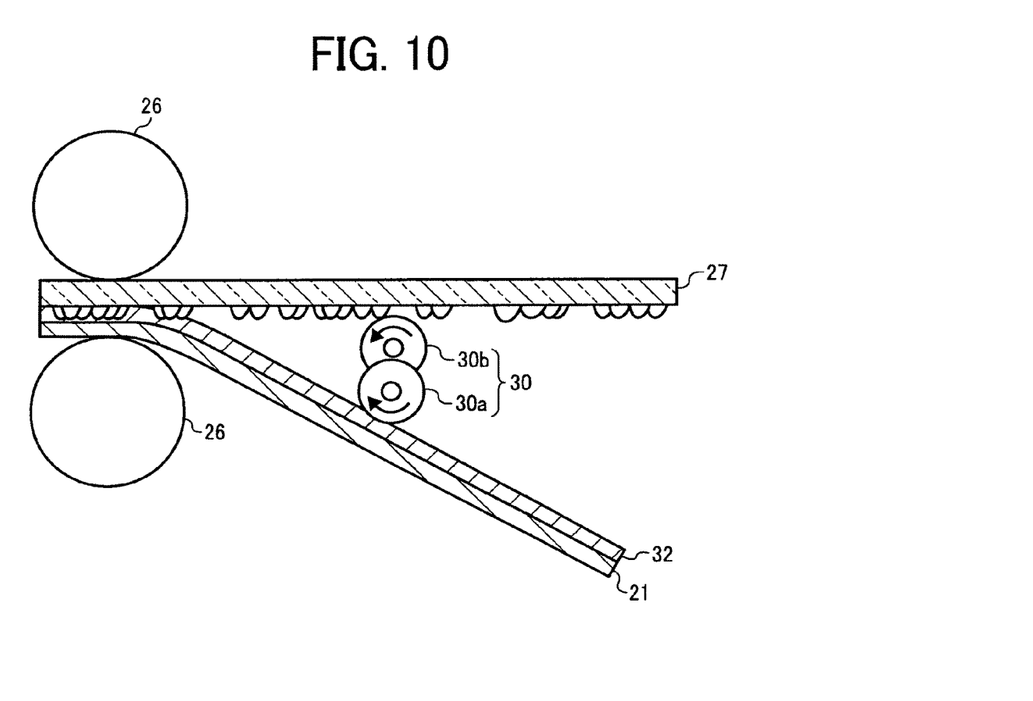
FIG. 10 is a schematic diagram of the transparent recording medium and the opaque medium that enter between the pressure rollers via the sticking preventer.

FIG. 9 is a schematic diagram of the transparent recording medium 27 and the opaque medium 21 that has stuck to each other without using any sticking preventer and entered between the pressure rollers 26, thereby bearing bubbles between the media 27 and 21. FIG. 10 is a schematic diagram of the transparent recording medium 27 and the opaque medium 21 entering between the pressure rollers 26 via the sticking preventer 30.

When, as shown in FIG. 9, the transparent recording medium 27 and the opaque medium 21 are fed to the nip area of the pressure rollers 26 in a state in which the media 21 and 27 stick to each other with an adhesive 32 (hereinafter, also "adhesive layer 32") on the opaque medium 21 without using any sticking preventer, the bubbles 31 are undesirably trapped between the media 27 and 21 due to improper bonding (displacement between the adhesive faces, incomplete close contact, and the like).

In contrast, according to the first embodiment, the sticking preventing rollers 30a and 30b of the sticking preventer 30 are interposed between the transparent recording medium 27 and the opaque medium 21 as shown in FIG. 10.

The sticking preventing rollers 30a and 30b are driven to bond the two media 27 and 21 together at an appropriate timing to prevent improper bonding. Accordingly, entrapment of bubbles between the two media 27 and 21 is prevented, and hence evenness of a white portion, at which no toner image is formed, is obtained.

Figure 11:
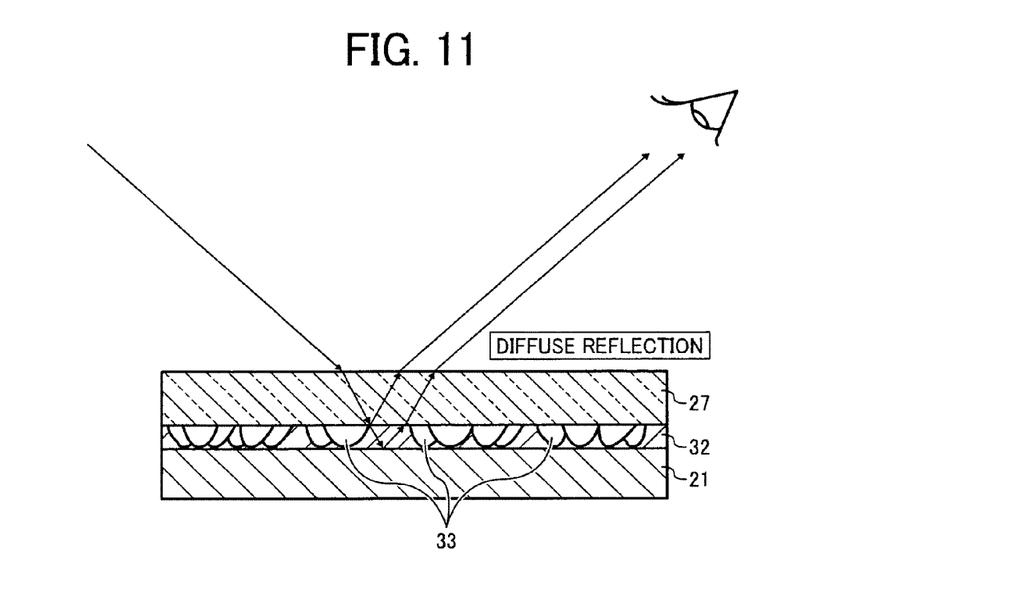
FIG. 11 is a schematic diagram for explaining refraction of light passing through the two media bonded together with no bubbles therebetween.
Figure 12:
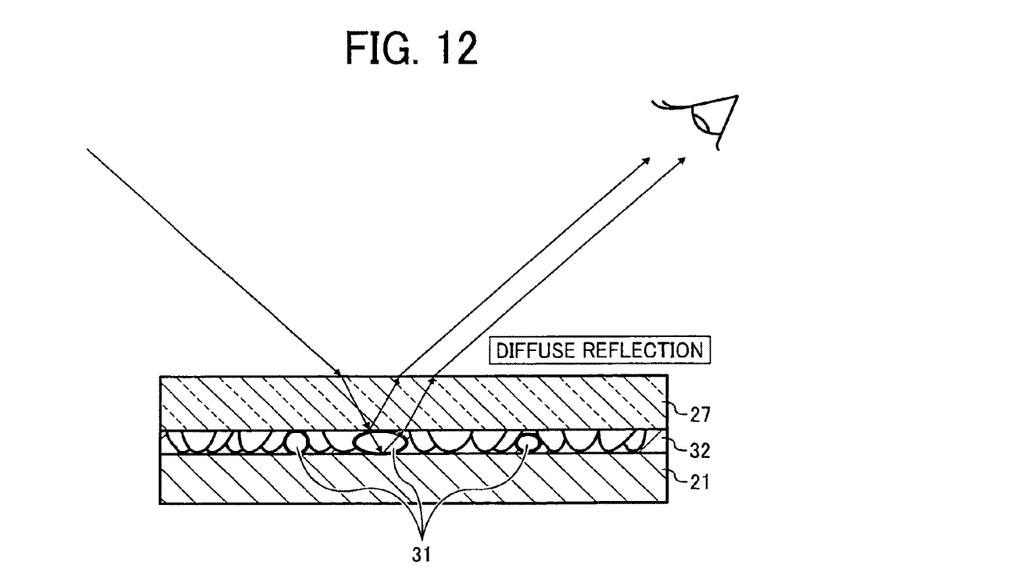
FIG. 12 is a schematic diagram for explaining refraction of light passing through the two media bonded together with bubbles trapped therebetween.

FIG. 11 is a schematic diagram for explaining refraction of light passing through two media bonded together with no bubbles therebetween. FIG. 12 is a schematic diagram for explaining refraction of light through two media bonded together with bubbles trapped therebetween.

When the transparent recording medium 27 and the opaque medium 21 stick to each other with no bubbles therebetween with the adhesive 32, diffuse reflection of refracted light does not occur. Therefore, evenness of a white portion, at which an image (toner image) 33 is not formed, is maintained (see FIG. 11).

In contrast, when improper adhesion causes the transparent recording medium 27 and the opaque medium 21 to bear the bubbles 31 therebetween, as shown in FIG. 12, light having passed through the transparent recording medium 27 is refracted through the bubbles 31. Because the refracted light results in diffuse reflection and imparts a shine, the evenness of the white portion is impaired.

Figure 13A:
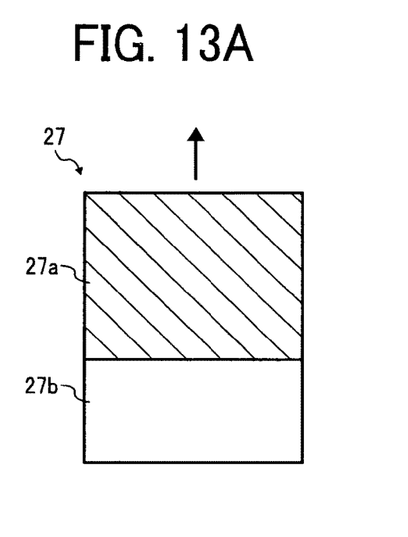
FIGS. 13A to 13D are schematic diagrams of examples of the transparent recording medium.
Figure 13B:
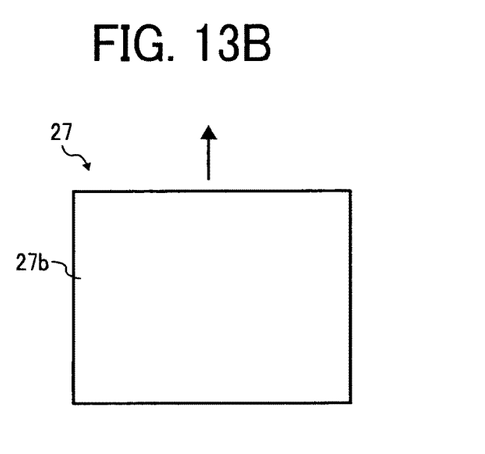

FIGS. 13A to 13D are schematic diagrams of examples of the transparent recording medium 27. As shown in FIG. 13A, a recording medium 27 can include an opaque portion 27a on a side of a leading end of the recording medium 27 in a conveying direction and a transparent portion 27b on a side of a trailing end. Alternatively, the entire recording medium 27 can be the transparent portion 27b as shown in FIG. 13B.

Figure 13C:
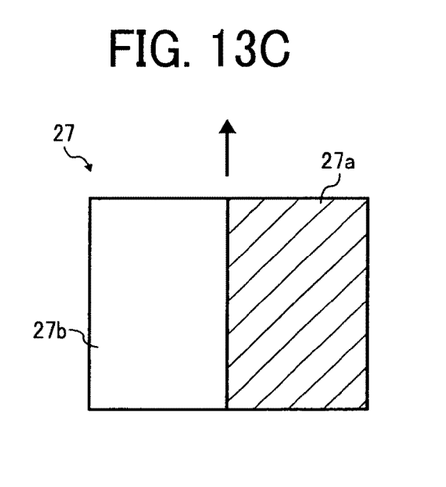
Figure 13D:
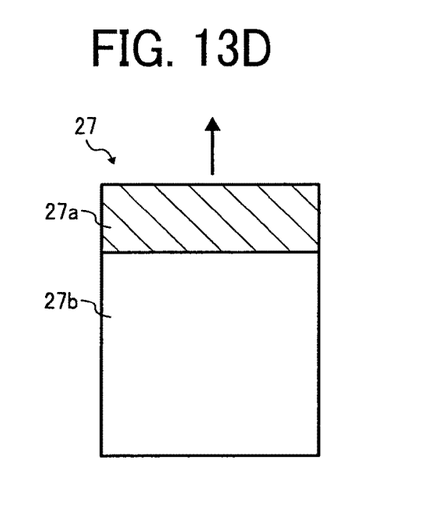

Further alternatively, as shown in FIGS. 13C and 13D, the recording medium 27 can be constituted such that a left half of the recording medium 27 is the transparent portion 27b and a right half of the same is the opaque portion 27a, or that only a leading end portion of the recording medium 27 is the opaque portion 27a and a remaining major portion is the transparent portion 27b. In short, an essential requirement for the recording medium 27 used in the present invention is to include a transparent portion at least in part.

Figure 14A:
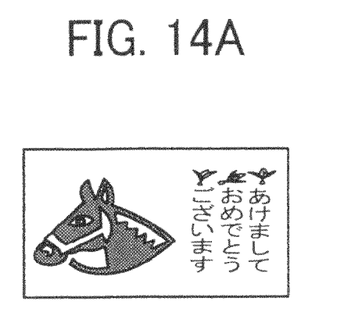
FIGS. 14A to 14D are schematic diagrams for explaining an image forming process performed by the image forming apparatus.
Figure 14B:
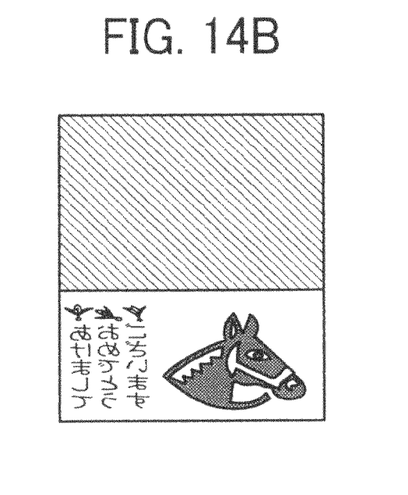
Figure 14C:
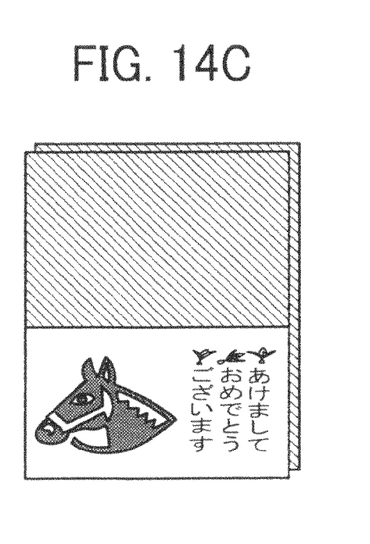

FIGS. 14A to 14D are schematic diagrams for explaining an image forming process performed by the image forming apparatus. With reference to FIG. 14B, a mirror image of the original image (data or a document) shown in FIG. 14A is formed on the transparent portion 27b of the recording medium 27 shown in, e.g., FIG. 13A.

Figure 14D:
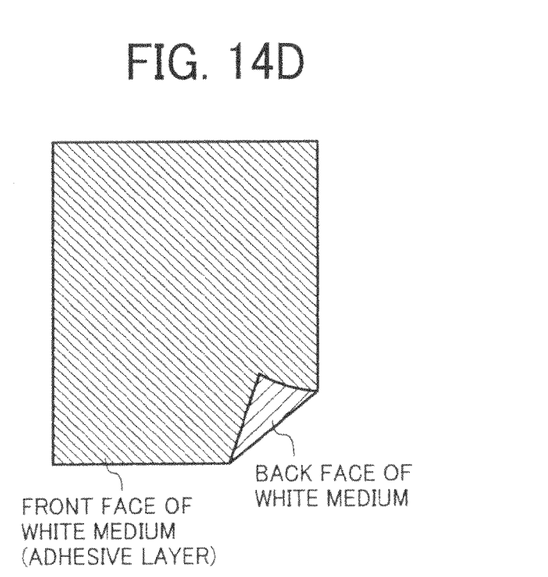

Thus, the mirror image is formed on an image forming surface of the transparent portion 27b of the recording medium 27. By superposing and bonding the opaque medium 21, on which the adhesive layer (white medium surface) 32 shown in FIG. 14D is formed, onto the image forming surface of the recording medium 27 (see FIG. 14C), a photographic image is obtained.

The sheet laminator according to a second embodiment of the present invention will be described with reference to the drawings. Because the sheet laminator according to the second embodiment is identical with that according to the first embodiment shown in FIG. 3 in configuration and the image forming apparatus according to the second embodiment is identical with that according to the first embodiment shown in FIG. 1 in configuration, redundant descriptions thereof will be omitted.

As shown in FIG. 3, the release-paper wind-up roller 24 takes up the release paper 22, thereby feeding out a leading end of the opaque medium (second sheet) 21 in a direction B' that obliquely intersects with a conveying direction A' of the transparent recording medium (first sheet) 27.

A conveying direction of the opaque medium 21 intersects with the conveying path of the transparent recording medium 27 conveyed by a pair of conveyor rollers 36. A guide member 110 (see FIGS. 20 to 24), which is a sheet-direction restricting unit, restricts a conveying direction (traveling direction) of the opaque medium 21. More specifically, an angle (angle relative to the transparent recording medium 27) of the leading end of the opaque medium 21 is restricted to a predetermined angle (i.e., an orientation during conveying is determined), causing the leading end of the opaque medium 21 to come into contact with the leading end of the transparent recording medium 27 (at a junction 35). The leading end of the transparent recording medium 27 and the leading end of the opaque medium 21 adhere to each other with the adhesive layer 32 on the opaque medium 21, and conveyed to the pressure rollers 26 in an extension direction of the conveying path of the transparent recording medium 27. The pressure rollers 26 cause the opaque medium 21 and the transparent recording medium 27 to securely adhere to each other into a unitary body. Thereafter, the transparent recording medium 27 and the opaque medium 21, which are thus adhered to each other into a bonded sheet, are conveyed downstream by a pair of conveyor rollers 37. After the bonded sheet is positioned by a positioning member (not shown) at a leading end of the bonded sheet, the bonded sheet is cut into a predetermined shape by cutters 38 and 39, and stacked on the stacker 9a. Alternatively, the bonded sheet cut into the predetermined shape can be ejected out of the image forming apparatus instead of stacked on the stacker 9a.

Figure 15:
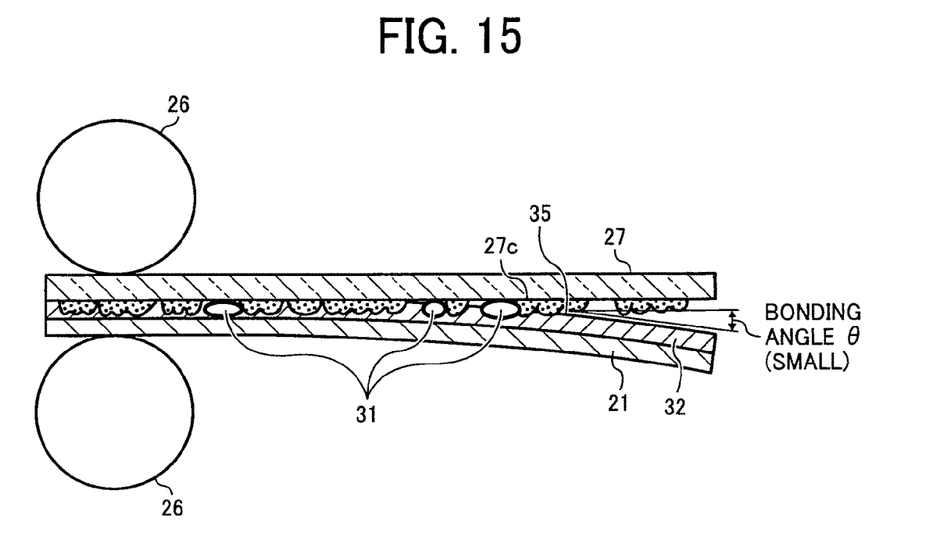
FIG. 15 is a cross-sectional view of a first sheet and a second sheet bonded together by the pressure rollers at a small bonding angle.
Figure 16:
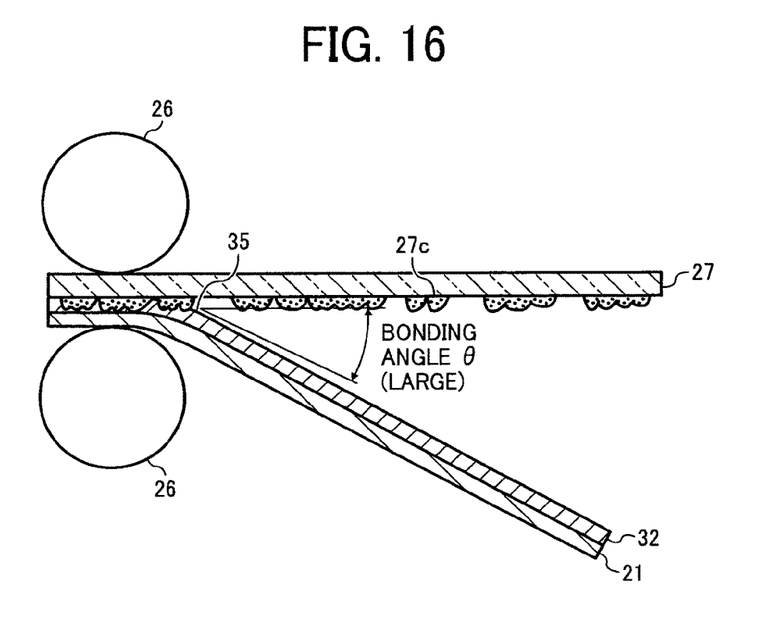
FIG. 16 is a cross-sectional view of the first sheet and the second sheet bonded together by the pressure rollers at a large bonding angle.

It has already been found by the present inventors that bubbles are easily trapped between the transparent recording medium 27 and the opaque medium 21 when a bonding angle $\theta$ therebetween falls within certain ranges. The relation between the bonding angle $\theta$ and bubbles will be described below briefly. FIG. 15 depicts a case that the bonding angle $\theta$ is small; that is, 10 degrees or smaller. FIG. 16 depicts a case in which the bonding angle $\theta$ is large; that is, 30 degrees or larger.

As is obvious from FIG. 15, when the bonding angle $\theta$ is small, the junction 35 is positioned upstream of the pressure rollers 26, and the bubbles 31 are trapped between a mirror image 27c on the transparent recording medium 27 and the adhesive layer 32 on the opaque medium 21. Even when pressure is applied to the media 21 and 27 from the pressure rollers 26 to bond the media 21 and 27 together, the bubbles 31 remain between the media 21 and 27 without escaping therefrom. As shown in FIG. 11, if the bubbles 31 are thus trapped between the mirror image 27c on the transparent recording medium 27 and the adhesive layer 32 on the opaque medium 21, light is refracted by the bubbles 31 while the light is passing through the transparent recording medium 27. Because the thus-refracted light results in diffuse reflection and imparts a shine, evenness of the white portion is impaired, and a gloss and photographic quality of the image are impaired.

As shown in FIG. 16, when the bonding angle $\theta$ is large; that is, equal to 30 degrees or larger, the junction 35 is positioned near the pressure rollers 26, thereby suppressing entrapment of the bubbles 31 between the mirror image 27c on the transparent recording medium 27 and the adhesive layer 32 on the opaque medium 21. Accordingly, as shown in FIG. 12, the evenness of the white portion, at which no toner image is formed, of a substrate is maintained, thereby attaining an image of a high gloss and a high photographic quality.

To suppress such entrapment of the bubbles 31, the bonding angle $\theta$ is preferably equal to or larger than 30 degrees and smaller than 90 degrees.

In the second embodiment, the sheet-direction restricting unit is provided at least near the junction 35 as shown in FIGS. 20 to 24 to control the bonding angle $\theta$. More specifically, the guide member 110, serving as the sheet-direction restricting unit, is provided to restrict a position of the opaque medium 21. The guide member 110 extends to a point between a separating position, at which the release paper 22 is separated from the opaque medium 21, and the junction (bonding position) 35. The guide member 110 can be a plate or a set of two or more belt-like members.

Meanwhile, the opaque medium 21 advances in a forward direction on the conveying path of the opaque medium 21 extending generally linearly or slightly curved. The guide member 110 extends such that the guide member 110 intersects an extension of the conveying path of the opaque medium 21 from an outer side (the side opposite from the laminating face) at a position downstream from a releasing position, at which the release paper 22 is stripped off from the opaque medium 21. The leading end of the opaque medium 21 comes into contact with the guide member 110, causing the opaque medium 21 to bend and advance along the guide member 110. According to the structure, the opaque medium 21 joins the transparent recording medium 27 while maintaining a desired orientation, forms a unitary body with the transparent recording medium 27, and further advances in the conveying direction.

In the structure in which the guide member 110 is provided as described above, the guide member 110 comes into contact with the leading end of the opaque media 21 and causes the opaque medium 21 to advance along the guide member 110 and join the transparent recording medium 27. The thus-joined media 21 and 27 are guided to the pressure rollers 26 to be laminated together. The guide member 110 can alternatively be divided in the conveying direction as required and located separately.

Figure 17:
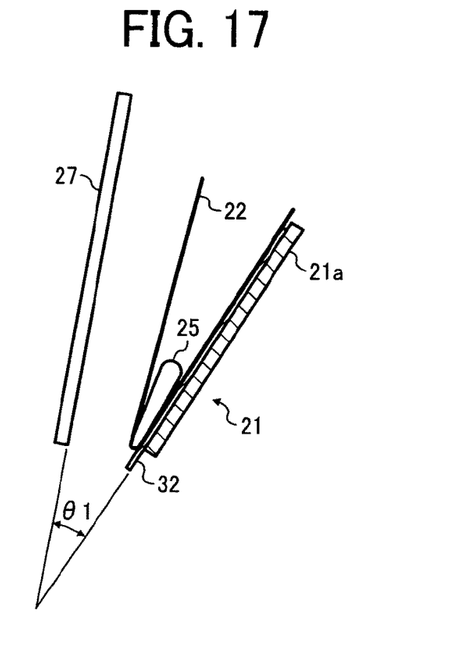
FIG. 17 is a cross-sectional view of a first state of the sheets near a bonding portion in the sheet laminator that is not provided with a guide.
Figure 18:
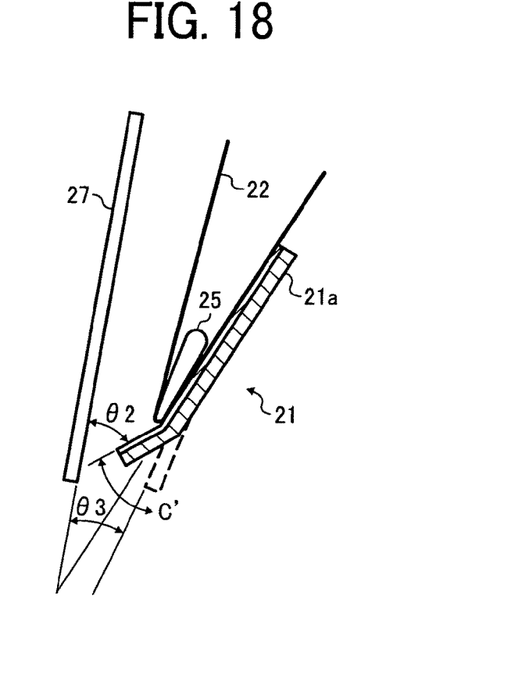
FIG. 18 is a cross-sectional view of a second state of the sheets near the bonding portion in the sheet laminator that is not provided with the guide.
Figure 19:
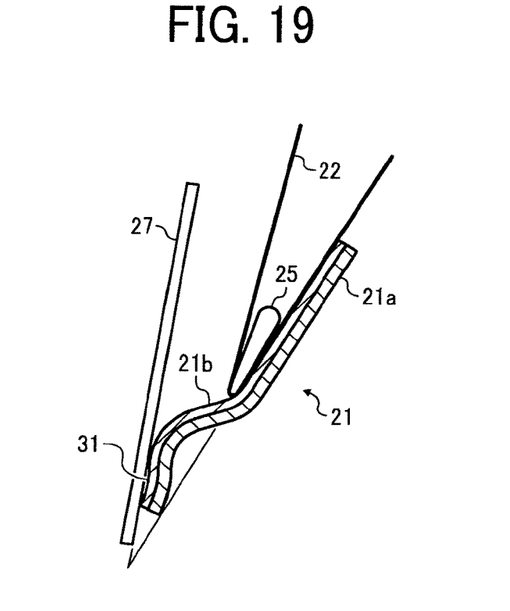
FIG. 19 is a cross-sectional view of a third state of the sheets near the bonding portion in the sheet laminator that is not provided with the guide.

Bonding of the opaque medium 21 will be described specifically with reference to enlarged cross-sectional views of the relevant parts near the bonding portion shown in FIGS. 17 to 24. Note that FIGS. 17 to 19 provided for comparison with the embodiment depict lamination with a conventional structure not including the guide member 110, in contrast to the second embodiment. When the guide member 110 is not provided as shown in FIGS. 17 to 19, the opaque medium 21 separated from the separating plate 25 is without restraint, and irregularly bent in a range indicated by arrow C' shown in FIG. 18. That is, the bonding angle $\theta$ varies within a range from $\theta 3$ to $\theta 2$ including an intended bonding angle $\theta 1$, where $\theta 3$ is equal to or smaller than $\theta 1$ and $\theta 2$ is equal to or larger than $\theta 1$. Therefore, it is highly probable that the transparent recording medium 27 and the opaque medium 21 stick to each other in an unintended state, thereby acquiring wrinkles and bearing the bubbles 31 as shown in FIG. 10.

Figure 20:
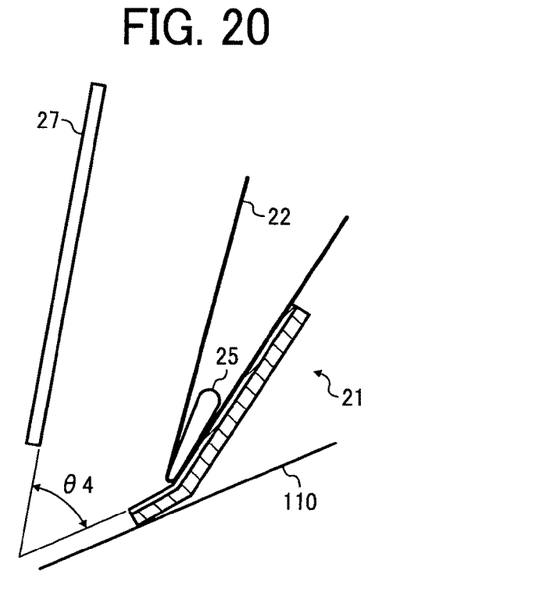
FIG. 20 is a cross-sectional view of the first state of the sheets near the bonding portion in the sheet laminator, according to the embodiment, that includes the guide.
Figure 21:
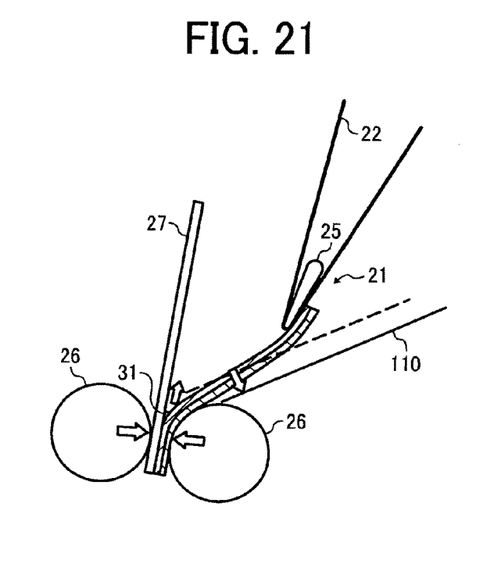
FIG. 21 is a cross-sectional view of a second state of the sheets near the bonding portion in the sheet laminator, according to the embodiment, that includes the guide.

In the second embodiment, as shown in FIG. 20, the guide member 110, which is the direction restricting unit, is provided upstream of the junction 35, and comes into contact with the opaque medium 21 from the side opposite from the adhesive face, thereby forcibly changing the conveying direction and restricting the orientation of the opaque medium 21 in this range of the conveying path (i.e., restricting the traveling direction of the leading end of the opaque medium 21). By setting a mounting angle $\theta 4$ of the guide member 110 to be equal to or larger than $\theta 2$, even when the opaque medium 21 advances as shown in FIG. 20, a relative angle is maintained at $\theta 4$ (see FIG. 21), and the bonding angle $\theta 4$ (equivalent to $\theta 1$ in FIG. 17) is obtained. Hence, a steady bonding angle is attained constantly, thereby achieving the object of the present invention of preventing two media 21 and 27 from contacting each other at an undesired position.

Figure 22:
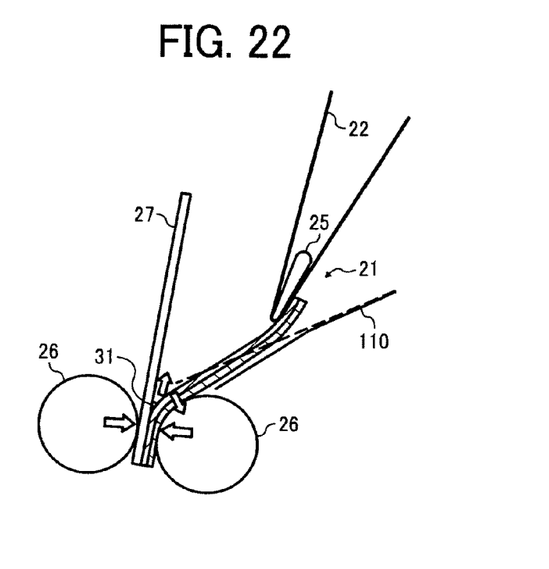
FIG. 22 is a cross-sectional view of a third state of the sheets near the bonding portion in the sheet laminator, according to the embodiment, that includes the guide.

When the guide member 110 is constructed to be fixed to a certain position and orientation, as shown in FIG. 22, not only the opaque medium 21 is excessively bent when the opaque medium 21 is pressed by the pressure rollers 26, but also the two media 21 and 27 come into contact with each other before the leading ends of two media 21 and 27 reach the nip area of the pressure rollers 26 to receive pressure. As a result, small bubbles are likely to be trapped between the media 21 and 27.

Figure 23:
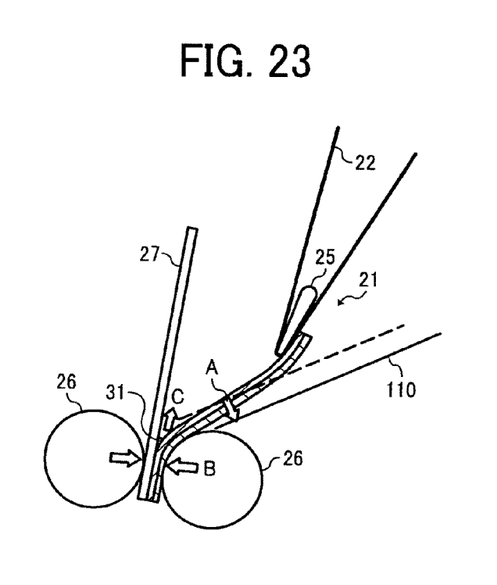
FIG. 23 is a cross-sectional view of a fourth state of the sheets near the bonding portion in the sheet laminator, according to the embodiment, that includes the guide.

To solve such an inconvenience, as shown in FIG. 23, another embodiment in which the guide member 110 retracts (recedes) in a direction indicated by arrow A by a spring force can be employed. Because the guide member 110 according to a structure shown in FIG. 23 receives a pressure from a spring (not shown), the leading ends of the media 27 and 21 pass through the junction 35 and reach the pressure rollers 26. Upon receipt of a strong force (tensile force exerted by the pressure rollers 26), the guide member 110 recedes (retracts) so that the guide member 110 does not obstruct bonding by the pressure rollers 26. According to this structure, because the media 27 and 21 receive pressure exerted in a direction indicated by arrow B in the nip area of the pressure rollers 26, the bubbles are pushed out in a direction indicated by arrow C, thereby preventing undesirable entrapment of the bubbles.

Figure 24:
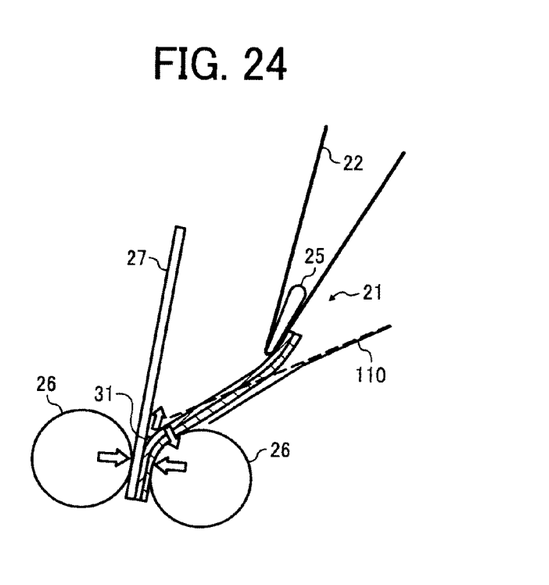
FIG. 24 is a cross-sectional view of a fifth state of the sheets near the bonding portion in the sheet laminator, according to the embodiment, that includes the guide.

As another structure, the guide member 110 can be formed from an elastic member having an appropriate magnitude of elastic force and constructed to have a fixed base end and a rotatable distal end as shown in FIG. 24. According to this structure, the elastic force of the guide member 110 causes the distal end of the guide member 110 to be retracted (receded) in a direction indicated by arrow D as the opaque medium 21 advances. Upon receipt the strong force (tensile force exerted by the pressure rollers 26), as in the preceding structure, the guide member 110 recedes (retracts) so that the guide member 110 does not obstruct bonding by the pressure rollers 26. According to the structure, pressure is applied in the direction indicated by arrow B in the nip area of the pressure rollers 26, the bubbles are pushed out in the direction indicated by arrow C, thereby preventing undesirable entrapment of the bubbles as well.

As described above, according to the second embodiment, because a position of the opaque white medium (opaque medium (second sheet) 21), from which the release paper 22 has been stripped off, is restricted, improper bonding; that is, bonding between the two media 21 and 27 at an unintended timing, can be prevented, and hence entrapment of the bubbles 31 between the two media 21 and 27 during a course of bonding is prevented. Hence, advantages; e.g., maintaining the evenness of the white portion having no toner image thereon, are provided, allowing to produce a sheet having an image of a high gloss and a high photographic quality thereon easily and reliably.

If the guide member 110, which is the direction restricting unit, can retract to a retracted position, the two media 21 and 27 come into contact while being pressed by the pressure rollers 26. Accordingly, favorable bonding between the media 21 and 27 without entrapment of bubbles is attained. When the guide member 110 is formed from an elastic member and has the fixed base end and the free distal end to press the medium (sheet) 21 at the free end, the two media (sheets) 21 and 27 are allowed to come into contact while being pressed by the pressure rollers 26 into bonding. Hence, a favorable bonding of the media 21 and 27 without trapping the bubbles 31 therebetween is attained with this simple structure.

When the sensors 28 and 29 are provided upstream of the junction 35 of the transparent recording medium (first sheet) 27 and the opaque medium (second sheet) 21, an abnormal operation can be detected. The sensors 28 and 29 detect positions of the transparent recording medium 27 and the opaque medium 21, and thereby feed speeds of the media 21 and 27 is adjusted so that the media 21 and 27 are conveyed at a proper timing. Therefore, the media 21 and 27 are bonded together with their leading ends flush with each other.

According to an embodiment of the present invention, it is possible to obtain the sheet laminator capable of attaining favorable bonding between the first sheet having the adhesive layer thereon and the second sheet. The conveying directions of the first sheet and the second sheet cross obliquely at the junction, and the first sheet and the second sheet are bonded together at the junction. Because the guide member is constructed to come into contact with the second sheet from the side opposite from the adhesive face and maintain contact with the second sheet to a position near the junction, the orientation of the second sheet is restricted. Accordingly, the first sheet and the second sheet are prevented from bonding to each other at an unintended timing, thereby attaining favorable lamination.

Particularly, adopting the sheet laminator into an electrophotographic image forming apparatus provides the following advantage. When an image formed by the image forming apparatus (it is considerably preferable to form the image with a small-particle polymer toner) is sandwiched between a transparent sheet and an opaque sheet and bonded together, entrapment of bubbles between the sheets is suppressed. That is, the image forming apparatus is capable of forming an image of a high gloss and a high photographic quality on an image recording sheet easily and reliably.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A sheet laminator, comprising:
   a bonding unit that bonds a first sheet to a second sheet that includes an adhesive layer; and
   a restricting unit that restricts movement of any one of the first sheet and the second sheet thereby preventing bonding between the first sheet and the second sheet before the first sheet and the second sheet reach the bonding unit,
   wherein the restriction unit is provided between the first and second sheets at upstream side at which the first and second sheets are bonded,
   wherein the restricting unit includes a direction restricting unit that comes into contact with a surface of the second sheet opposite to the adhesive layer until the second sheet reaches the bonding unit, thereby restricting a conveying direction of the second sheet, and
   wherein the direction restricting unit includes at least one guide member that comes into contact with the second sheet, the at least one guide member being movable between an operating position for restricting the conveying direction and a retracted position.

2. The sheet laminator according to claim 1, wherein the first sheet is a recording medium that includes a transparent portion on which a mirror image is to be formed, and the second sheet is an opaque medium.

3. The sheet laminator according to claim 1, wherein the restricting unit includes a sticking preventer that prevents sticking of the first sheet and the second sheet.

4. The sheet laminator according to claim 3, wherein
the sticking preventer includes a first sticking preventer and a second sticking preventer, and
either the first sticking preventer that is arranged near the second sheet or both of the first sticking preventer and the second sticking preventer include a shaft and at least one roller attached to the shaft.

5. The sheet laminator according to claim 4, wherein
each of the first sticking preventer and the second sticking preventer includes a shaft and at least one roller attached to the shaft, and
the rollers of the first sticking preventer and the second sticking preventer are displaced in a shaft direction so that a distance between the shafts can be shorter than a sum of radii of the rollers.

6. The sheet laminator according to claim 4, wherein a friction coefficient of surfaces of the first sticking preventer and the second sticking preventer is substantially equal to a friction coefficient of a releasing surface of release paper affixed to the adhesive layer of the second sheet.

7. The sheet laminator according to claim 3, wherein either the first sticking preventer or both of the first sticking preventer and the second sticking preventer include a shaft and a spur member attached to the shaft.

8. The sheet laminator according to claim 1, wherein either one of the first sheet and the second sheet is formed from a transparent sheet, and other one of the first sheet and the second sheet is formed from an opaque sheet.

9. The sheet laminator according to claim 1, wherein the bonding unit bonds the first sheet on which an image is formed and the second sheet together in such a manner that the image is placed between the first sheet and the second sheet.

10. The sheet laminator according to claim 1, wherein either one of the first sheet and the second sheet is formed from a transparent sheet and other one of the first sheet and the second sheet is formed from an opaque sheet.

11. The sheet laminator according to claim 1, wherein the bonding unit bonds the first sheet on which an image is formed and the second sheet together in such a manner that the image is placed between the first sheet and the second sheet.

12. The sheet laminator according to claim 1, wherein
the bonding unit includes a pair of pressure rollers that presses the first sheet and the second sheet, and
the at least one guide member is pressed in a direction from the retracted position to the operating position by an urging force generated by an urging unit, wherein the urging force is stronger than a repulsive force of the second sheet pressing the at least one guide member when the repulsive force is generated by a bending force of the second sheet, and weaker than repulsive force when the pressing force is generated by a sheet-pulling force of the pressure rollers.

13. The sheet laminator according to claim 12, wherein
the at least one guide member is formed from an elastic member and includes a fixed base end and a free distal end that comes into contact with the second sheet, thereby urging the second sheet with the urging force due to elasticity, and
the urging force is stronger than the repulsive force when the repulsive force is generated by the bending force of the second sheet, and weaker than the repulsive force when the repulsive force is generated by the sheet-pulling force of the pressure rollers.

14. The sheet laminator according to claim 1, further comprising a detecting unit that is arranged upstream of the bonding unit and that detects a position of each of the first sheet and the second sheet.

15. The sheet laminator according to claim 3, wherein the sticking preventer includes a first sticking preventer and a second sticking preventer, each of the first and second sticking preventers includes a shaft and a plurality of rollers attached to the shaft thereof.

16. The sheet laminator according to claim 15, wherein the first sticking preventer and the second sticking preventer are counter-rotating.

17. The sheet laminator according to claim 15, wherein the plurality of rollers of the first sticking preventer and the plurality of rollers of the second sticking preventer are provided in a staggered arrangement.

18. The sheet laminator according to claim 1, wherein leading ends of the first and second sheets are to be flushed with each other.

19. A sheet laminator, comprising:
a bonding unit that bonds a first sheet to a second sheet that includes an adhesive layer; and
a restricting unit that restricts movement of any one of the first sheet and the second sheet thereby preventing bonding between the first sheet and the second sheet before the first sheet and the second sheet reach the bonding unit,
wherein the restriction unit is provided between the first and second sheets at upstream side at which the first and second sheets are bonded,
wherein the restricting unit includes a sticking preventer that prevents sticking of the first sheet and the second sheet,
wherein the sticking preventer includes a first sticking preventer and a second sticking preventer, each of the first and second sticking preventers includes a shaft and a plurality of rollers attached to the shaft thereof, and
wherein the plurality of rollers of the first sticking preventer and the plurality of rollers of the second sticking preventer are provided in a staggered arrangement.

* * * * *